United States Patent [19]
Vossler

[11] Patent Number: 5,856,819
[45] Date of Patent: Jan. 5, 1999

[54] BI-DIRECTIONAL PRESENTATION DISPLAY

[75] Inventor: Stephen P. Vossler, Sioux Falls, S. Dak.

[73] Assignee: Gateway 2000, Inc., North Sioux City, S. Dak.

[21] Appl. No.: 639,702

[22] Filed: Apr. 29, 1996

[51] Int. Cl.[6] .................................................. G09G 3/36
[52] U.S. Cl. ................................................ 345/102; 345/5
[58] Field of Search ............................ 345/1, 5, 87, 905, 345/901, 102, 168, 169; 364/708.1

[56] References Cited

U.S. PATENT DOCUMENTS

| | | |
|---|---|---|
| 4,243,986 | 1/1981 | Nixon . |
| 4,901,140 | 2/1990 | Lang et al. ................................. 358/64 |
| 4,943,851 | 7/1990 | Lang et al. ................................. 358/87 |
| 4,973,951 | 11/1990 | Shigeta et al. ............................... 345/1 |
| 5,115,228 | 5/1992 | Harris et al. ............................... 345/87 |
| 5,146,354 | 9/1992 | Plesinger ................................... 359/49 |
| 5,202,950 | 4/1993 | Arego et al. .............................. 385/146 |
| 5,262,763 | 11/1993 | Okuyama et al. ......................... 345/87 |
| 5,272,327 | 12/1993 | Mitchell et al. ......................... 250/205 |
| 5,343,262 | 8/1994 | Park ........................................ 353/119 |
| 5,357,277 | 10/1994 | Nakayoshi et al. ....................... 348/55 |
| 5,357,355 | 10/1994 | Arai ............................................ 345/5 |
| 5,359,550 | 10/1994 | Chen .................................... 364/708.1 |
| 5,406,268 | 4/1995 | Fullmer ................................. 340/815.42 |
| 5,414,444 | 5/1995 | Britz ........................................ 345/156 |
| 5,428,365 | 6/1995 | Harris et al. ............................... 345/55 |
| 5,467,205 | 11/1995 | Kuba et al. ................................. 359/40 |

FOREIGN PATENT DOCUMENTS

| | | |
|---|---|---|
| 1131913 | 5/1989 | Japan . |
| 2 153 189 | 8/1995 | United Kingdom . |

OTHER PUBLICATIONS

"New Presentation Notebooks Sport Displays that Double as LCD Panels", *PC World,* Laurianne McLaughlin and Randy (eds), 65–66, 68, (Sep. 1995).

*Primary Examiner*—Regina Liang
*Attorney, Agent, or Firm*—Schwegman, Lundberg, Woessner & Kluth, P.A.; Anthony Claiborne

[57] ABSTRACT

A bi-directional presentation display device for displaying an image visible to an audience on both sides of the display device. The display device has a pair of screens, each defining an image surface which face in generally opposite directions relative to one another. The display includes a power means for providing power to the pair of screens. A reflective element is disposed between the screens for aiding in illuminating the screens. A single light source concurrently illuminates the screens for displaying an image on the pair of image surfaces.

26 Claims, 7 Drawing Sheets

FIG. 8

BI-DIRECTIONAL PRESENTATION DISPLAY

FIELD OF THE INVENTION

The present invention relates to an apparatus for use as a presentation display, and more specifically to a bidirectional presentation display for use with a computer.

BACKGROUND OF THE INVENTION

Computers are often used for making presentations to one or more people. Business persons frequently travel to locations remote from their own office to meet with others taking with them only a laptop computer. Also, business persons often make presentations within their own working environment or offices. These meetings may be informal and entail only a presenter sharing computer information with a small audience of one or more individuals. These meetings may also be more formal and entail one or more presenters sharing information stored in a computer with a relatively large audience.

Information stored in a computer is sometimes of great value in making a presentation but difficult to share with an audience because the computer screen may not be visible and accessible to the audience. When the computer screen is positioned so that the audience can see it, the presenter is normally positioned behind or next to the screen where the image is either not visible or visible upside down or at a very sharp angle with respect to the presenter. The presentation is therefore limited by the type, orientation and size of display screen connected to the computer and the size of the audience.

There are a number of display products available which permit a computer to be used for presenting information to an audience. Laptop computers are available with a removable panel on the back of the computer screen. When the panel is removed, the screen, which is now transparent, may be folded down away from and parallel with the keyboard and set over an overhead projector screen. The image displayed on the computer screen will then be projected onto a wall or retractable screen in a conventional manner. This type of system requires access to a screen or a white and relatively smooth wall and also requires availability and use of an overhead projector.

An additional prior art product is available which projects an image received from a video output device such as a cam-corder or VCR onto a large screen or wall. The product includes a small liquid crystal display (LCD) screen which produces a video image and projects it onto a larger screen or a wall.

Another prior art display screen is a portable LCD projector having a housing which contains projection and light mechanisms inside. A rear projection screen is pivotally attached to the housing which when pivoted up to an essentially vertical position displays an image which is projected onto the screen from within the housing. This type of display only has one display surface which may be directed towards an audience or the presenter, but not both.

Another type of LCD projection system has a cylindrical rear projection screen which displays an image on the external surface of the screen. The cylindrical screen is rotated at a relatively high rate synchronized with an image periodically projected onto portions of the screen such that a viewer will see the image when it is projected onto the screen section normal to his or her angle of view. The rotation speed of the screen is such that viewers positioned around the screen will see a particular image substantially simultaneously. This type of display screen is relatively complex in construction and therefore somewhat costly and is not easily transportable since it is not collapsible.

One significant problem with these prior art devices is that a projected image does not have the same quality as the true original image. This is because a projected image is enlarged causing the image to have a lesser quality, fidelity and resolution when compared to the original displayed image. Another cause is that the image is often projected onto a surface such as a wall which is usually not clean, smooth and free of obstructions such as light switches, signs, artwork and the like.

What is needed is an improved presentation display device which displays an image visible simultaneously to viewers situated on opposite sides of the display device. What is further needed is a presentation display device which may be connected directly to a standard port of a computer for communicating therewith. What is additionally needed is a presentation display device which is highly portable and consumes a minimal amount of power. What is also needed is a presentation display device which is relatively simple in construction requiring little or no maintenance and is of relatively low cost. What is further needed is a presentation display device which produces an image visible in its original form and not in a from projected from a source to another surface or display medium.

SUMMARY OF THE INVENTION

The present invention teaches a bi-directional presentation display device for displaying images which are received from a computer or other image source. The presentation display device of the invention has a front and a rear display screen. A front image surface is defined by the front display screen and a rear image surface is defined by the rear display screen. The display screens are positioned such that the front and rear image surfaces face in generally opposite directions relative to one another.

The presentation display device also includes a power means for providing power to operate the display device. A reflective element is disposed between the front and rear display screens. The presentation display device also has a light source for concurrently illuminating the front and rear display screens to display an image on the front and rear image surfaces, respectively.

According to one aspect of the present invention, the presentation display device is adaptable to simultaneously display an image to viewers seated on opposite sides of the device. According to another aspect of the present invention, the presentation display device is easily connected to a standard computer port for communicating with the computer and receiving digital signals therefrom. According to yet another aspect of the present invention, the presentation display device is relatively compact and therefore highly portable making the device easy to transport and carry. According to a further aspect of the present invention, the presentation display device is of a relatively simple construction utilizing standard LCD components requiring minimum maintenance and is therefore of relatively low cost. According to still another aspect of the present invention, the presentation display device is capable of producing an image of high resolution, fidelity and quality and is not projected from an initial display screen to a secondary screen or display medium.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
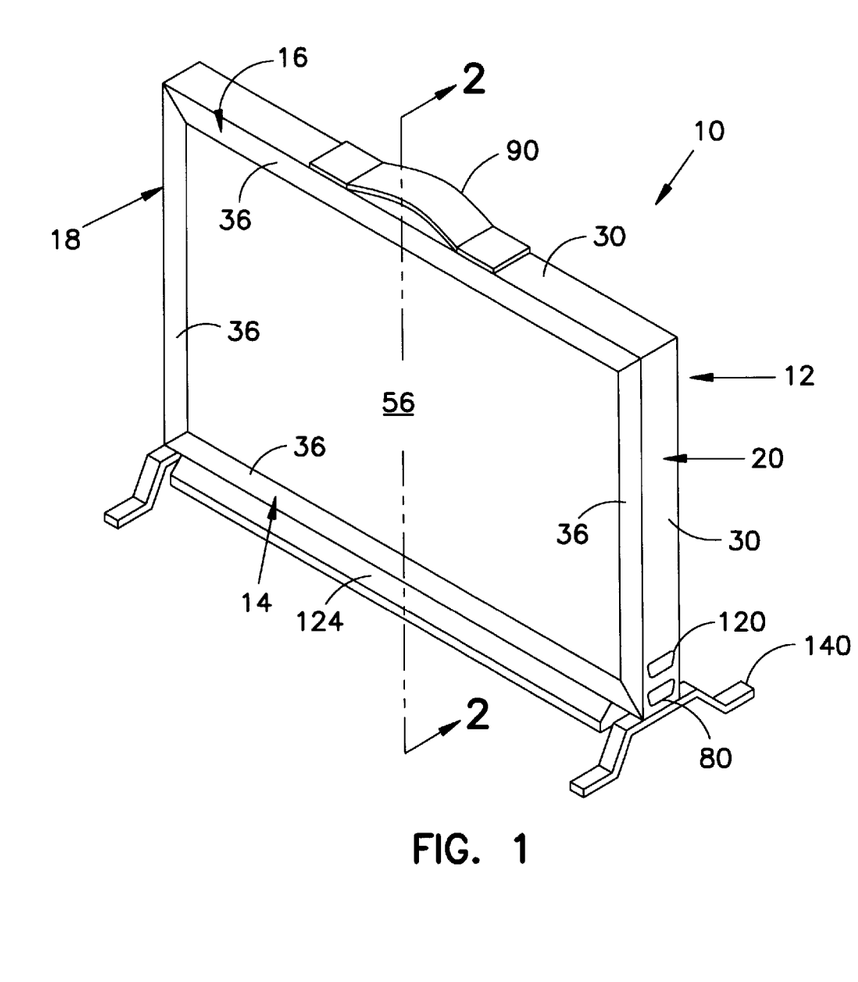
FIG. 1 is a perspective view illustrating a presentation display device constructed in accordance with one embodiment of the present invention.

Referring now in more detail to the drawings, FIG. 1 illustrates a bi-directional presentation display device 10 constructed in accordance with the present invention. Display device 10 in one embodiment has a support bezel 12 of a generally rectangular construction having a bottom member 14 and a top member 16 spaced from the bottom member and generally parallel thereto. Top member 16 and bottom member 14 are interconnected by a first side member 18 and a second side member 20 which perpendicularly connect to the top and bottom members at opposite ends and are generally parallel to one another.

Figure 2:
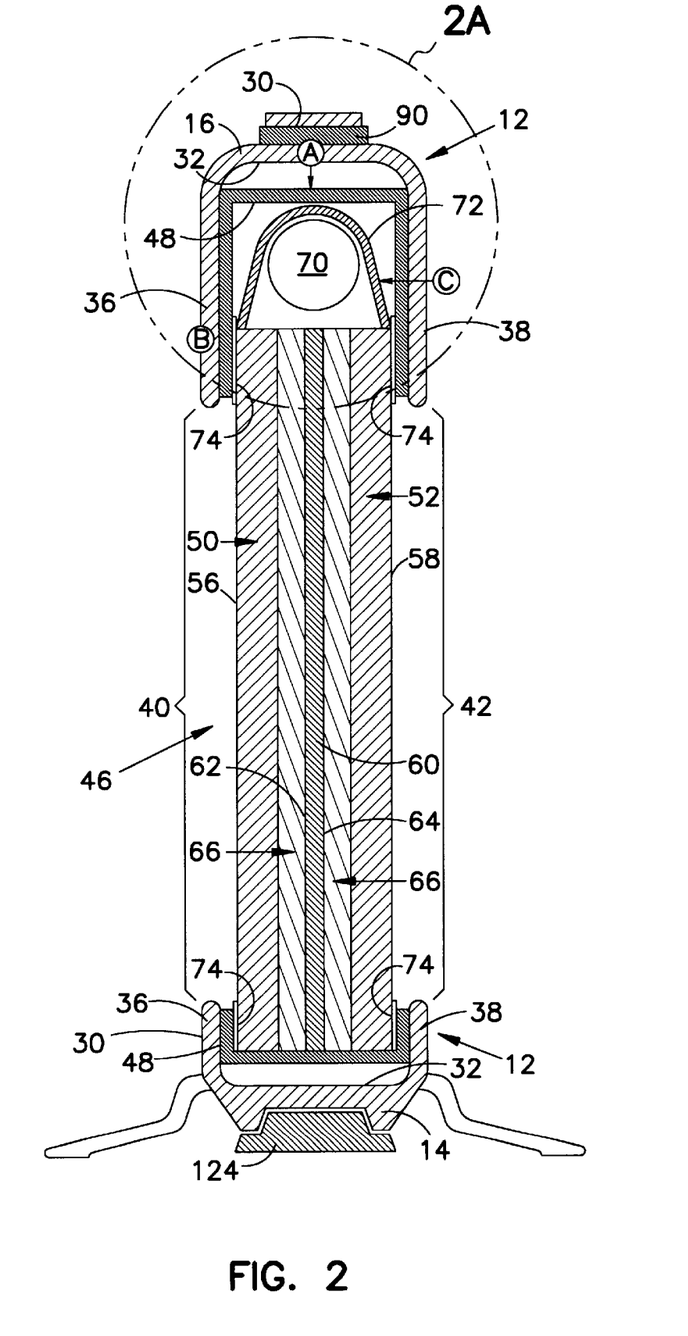
FIG. 2 is a side sectional view taken along line 2—2 of FIG. 1.
Figure 2A:
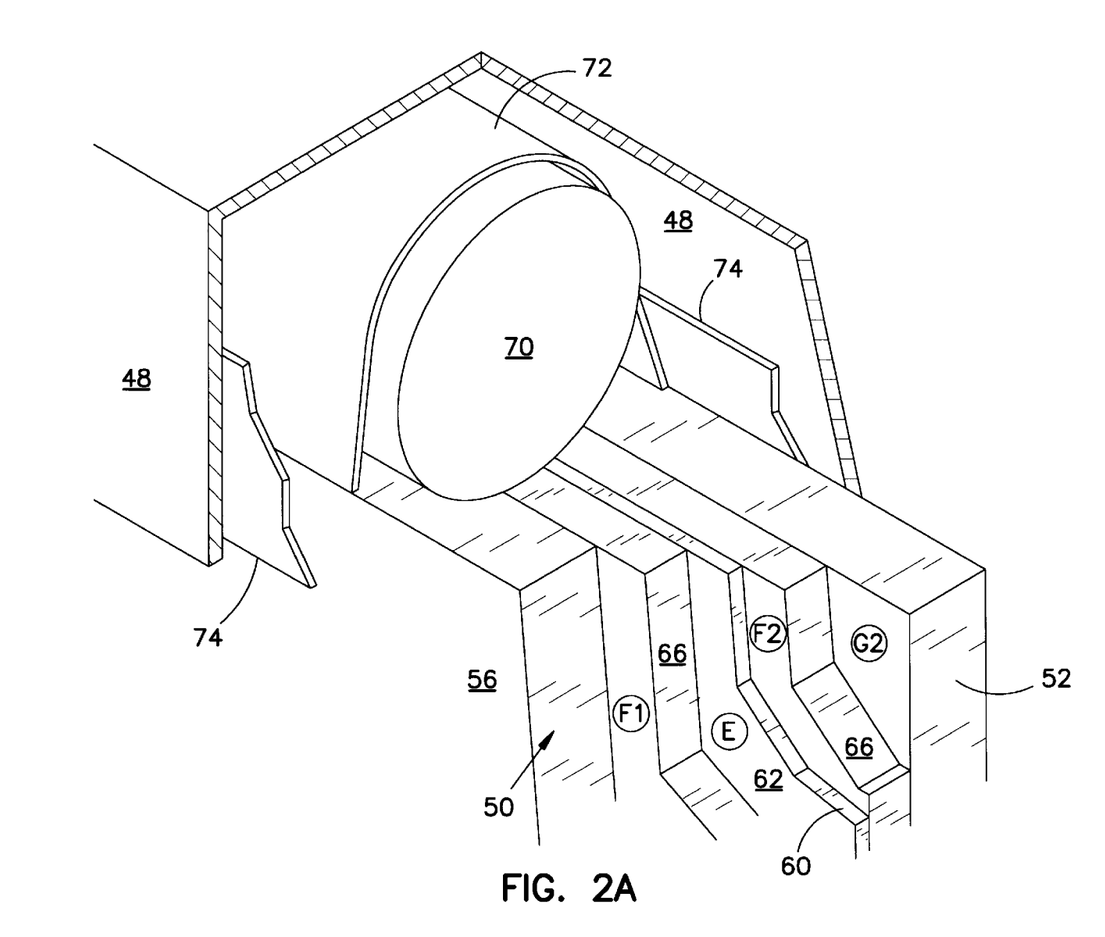
FIG. 2A is a perspective view of an enlarged fragmentary section of the constituent parts of the device taken from circle 2A of FIG. 2.

As best illustrated in FIGS. 2 and 2A, each bezel member 14, 16, 18 and 20 is preferably formed of a molded thermoplastic material having a U-channel construction viewed in the cross section. The external shape or contour of bezel 12 provides display device 10 with its aesthetic appearance and may take on any number of configurations without departing from the scope of the present invention. When assembled, bezel 12 has an outer perimeter wall 30 and an inner annular channel 32 for receiving the constituent parts of the display device therein which will be described in more detail below. The interconnected bezel members 14, 16, 18 and 20 define a pair of perimeter flanges 36 and 38 extending inwardly from perimeter wall 30 of bezel 12. Flange 36 defines a front display opening 40 and rear flange 38 defines a rear display opening 42 in bezel 12. As will be evident herein to those of ordinary skill in the art, the bezel openings are arbitrarily described as front and rear openings for convenience of description only and not intended to limit the orientation of the bezel in any way.

As illustrated in FIGS. 2 and 2A, a display apparatus 46 is carried by a rigid rectangular frame 48 which is received within inner channel 32 of bezel 12 and retained therein be flanges 36 and 38. In one embodiment, display apparatus 46 is a unitary liquid crystal display (LCD) apparatus having a front LCD screen 50 and a rear LCD screen 52. Front screen 50 is disposed such that it is adjacent front display opening 40 of bezel 12 and rear screen 52 is disposed adjacent rear display opening 42 of bezel 12. As will be evident to those skilled in the art, other types of display elements or screens which require backlighting can be utilized as display apparatus 46 without departing from the scope of the present invention. As with front and rear display openings 38 and 40, screens 50 and 52 are labeled as front and rear for descriptive purposes only, with such labels being arbitrary and not intended to limit the orientation of display apparatus 46 in any way.

As best illustrated in FIGS. 2 and 2A, display apparatus 46 may have an essentially symmetrical construction, although an asymmetrical construction is within the scope of the present invention. Front screen 50 of LCD apparatus 46 defines a front image surface 56 facing outwardly from frame 48 and being visible through front display opening 40 of bezel 12. Rear screen 52 defines a rear image surface 58 facing outwardly from frame 48 and being visible through rear display opening 42 of bezel 12. Screens 50 and 52 of the present embodiment are preferably disposed back to back such that image surfaces 56 and 58 face essentially 180° opposite one another.

Each of front and rear LCD screens 50 and 52 embodies a portion of a typical LCD construction. Each screen has two parallel and spaced apart glass plates with electrically conductive lines on their inner surfaces and a liquid crystal compound, typically of a clear organic material, encased and sealed between the glass plates. The glass plates of one or both of screens 50 and 52 may include commonly known light polarizers, colorizers and filters for producing a color image on one or both of image surfaces 56 and 58. The liquid crystal compound is clear until subjected to an electric field defined by the conductive lines. The liquid crystals of the compound orient relative to the applied field and act as an additional polarization filter layer according to the pattern of the applied field. Such a liquid crystal glass construction is well known in the art and, therefore, will not be described in further detail herein. Each of front and rear screens 50 and 52 is intended to include such a construction but both are simply shown as a single unit for simplification of the description.

Some LCD's utilize ambient light to illuminate the display whereas many other LCD's utilize internal back lighting to illuminate and make visible the images created by the liquid crystal compound. LCDs with back lighting generally provide a more uniform image and one which is visible regardless of the level of ambient light. In one embodiment illustrated in FIGS. 2 and 2A, display apparatus 46 includes a single reflective plate 60 constructed of a rigid or semi-rigid reflective material such as polished steel, chrome, aluminum coated with a common sealant to prevent corrosion, or other similar material disposed between front screen 50 and rear screen 52 within frame 48. Reflective plate 60 has a front reflective surface 62 facing and spaced from front screen 50 and a rear reflective surface 64 on the opposite side of plate 60 generally parallel to front reflective surface 62 which faces and is spaced from rear screen 52.

Display apparatus 46 also includes a light distribution medium 66 disposed between front reflective surface 62 and front screen 50 and also disposed between rear reflective surface 64 and rear screen 52. Each light distribution medium 66 is constructed to transmit light from a source and evenly distribute the light over the entire surface areas of front and rear panels 50 and 52. One such light distribution medium comprises a plurality of light pipes which communicate with a light source and distribute the light over the surface area of the reflective plate of an LCD. Various light pipe constructions are known and may be employed which have different diffusion, scattering, reflection, and distribution characteristics in order to reduce transmission losses and efficiently distribute light over screens 50 and 52. Constructions other than light pipes that transmit and evenly distribute light over a flat surface area and have a relatively thin cross-section such as conventional LCD light curtains are also suitable for use in the invention.

In a preferred embodiment of display device 10, a single light source 70 is disposed within frame 48 adjacent one edge of display apparatus 46. As shown in FIGS. 2 and 2A, light source 70 is held within a light reflector 72 on top of frame 48 adjacent top member 16 of bezel 12 above display apparatus 46. Light reflector 72 insures that light produced by source 70 is directed toward display apparatus 46. Frame 48 may alternatively be constructed to provide the reflective surface in place of reflector 72 as will be readily seen to those skilled in the art. Light source 70 is intended to provide light to the distribution medium 66 for distribution over the front and rear screens 50 and 52. Light source 70 is preferably a cold cathode fluorescent tube of an elongate construction extending essentially the entire length of the edge of display apparatus 46 adjacent to which it is installed, or in this case, the top edge. As will be seen by those of ordinary skill in the art, light source 70 may be oriented within frame 48 along any edge of display apparatus 46 adjacent any of bezel members 14, 16, 18 or 20 without departing from the scope of the present invention. The use of a single light tube to illuminate both screens 50 and 52 provides significant power-savings over an arrangement requiring two light tubes, one per LCD screen. Such power savings is critical when operating the displays from a battery source.

Alternatively, at least one or more additional light tubes may be incorporated with display apparatus 46 adjacent one or more of its other edges to substitute for light tube 70 in case it burns out or otherwise fails. It is intended that any additional light tube be positioned to provide light for both of display screens 50 and 52 when used. Such alternate light sources may also be of a different type than the primary light source 70. For example, the alternate source may provide ultraviolet or infrared light to the display apparatus 46 and the display device 10 may include electronics allowing a user to select the type of lighting to use depending on the conditions under which the display device is used. The infrared option would permit the display device 10 to be used, perhaps for military purposes, at night or in the dark, by utilizing night vision equipment while images displayed on screens 50 and 52 remain invisible to the naked eye.

A gasket or seal 74 is disposed on the front and rear sides of display apparatus 46 around the perimeter between frame 48 and each of screens 50 and 52. Seal 74 further reduces the loss of transmitted light and also seals the constituent parts of display apparatus 46 from outside air preventing contamination of the components.

In one embodiment illustrated in FIG. 1, display device 10 includes an input interface 80 for connecting to a mother system such as a computer (not shown). Input interface 80 may be a standard VGA interface connector which connects via a standard cable directly to a VGA port of the computer for simple connection thereto. Input interface 80 may alternatively be a conventional high speed bus interface, a connector to accommodate what is commonly known as Fire Wire (subject to standard IEEE 1394), a high speed serial bus interface, or other suitable connector type. Electronic audio, video and control signals may be received from the mother system and transmitted through interface 80 where the video signals are transmitted to the conductive lines and LCD compound (not shown) within front and rear screens 50 and 52 for creating the desired image on image surfaces 56 and 58. Display apparatus may be constructed with front screen 50 and rear screen 52 being either monochrome, passive-matrix color, active-matrix color, or some combination of image screens without departing from the scope of the present invention.

Other alternative connections for transmitting between the mother system and display device 10 may include the use of some portion of the electromagnetic (EM) spectrum such as infra-red (IR) light or radio frequency (RF) waves. The mother system (not shown) for such a system is provided with a transmission circuit that encodes the audio, video and control signals into predetermined EM signals. Display device 10 contains a corresponding receiving device 81 that decodes the EM signals back into the corresponding audio, video and control signals.

Figure 3:
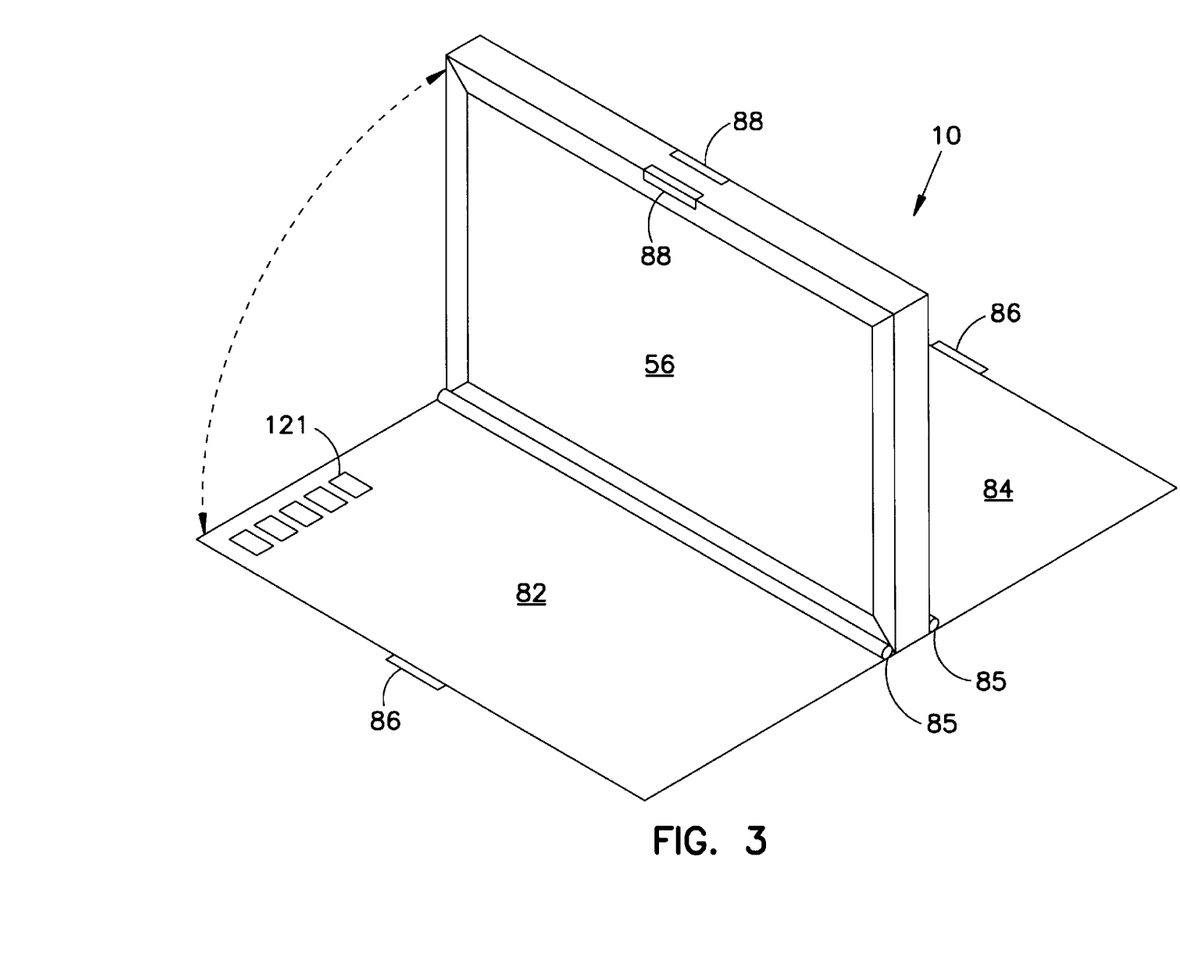
FIG. 3 is a side view illustrating an additional embodiment of a presentation display device constructed in accordance with the present invention.
Figure 4:
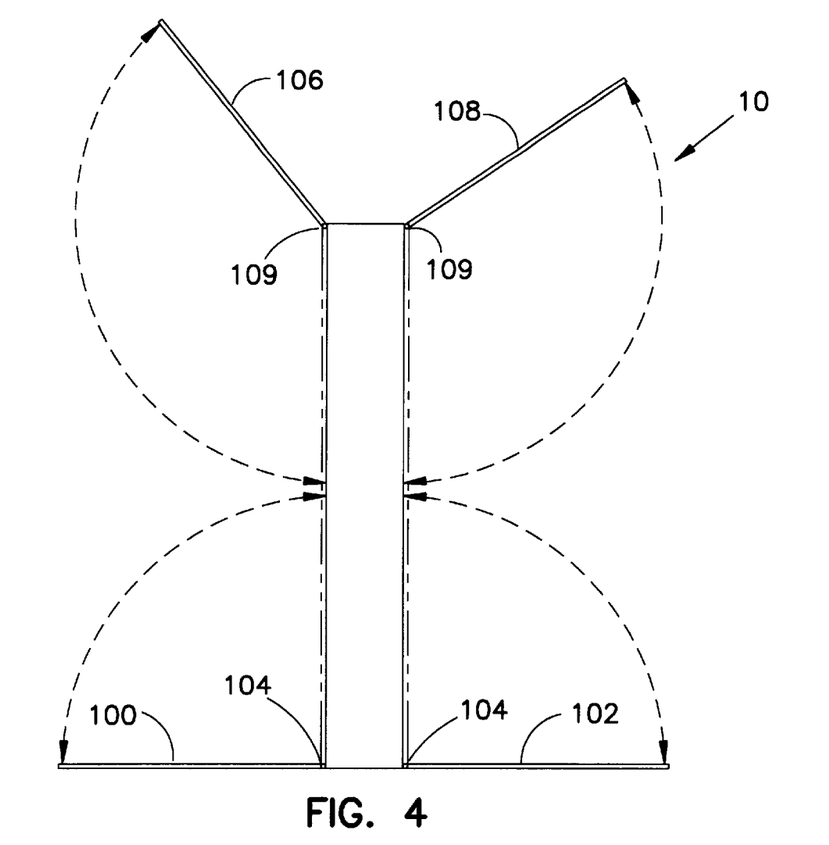
FIG. 4 is a side view illustrating another embodiment of a presentation display device constructed in accordance with the present invention.

As illustrated in FIGS. 3 and 4, another embodiment of display device 10 includes protective covers of various constructions for preventing damage or harm to front screen 50 and rear screen 52 when the display device is being transported. As illustrated in FIG. 3, a front protective cover 82 and rear protective cover 84 are hingedly attached to bezel 12 of display device 10, preferably at the front and rear bottom edges of bottom member 14. Covers 82 and 84 are rotatable about a hinge 85 to either a closed position parallel with and directly adjacent to their respective screens 50 and 52 covering the entire front and rear image surfaces 56 and 58, respectively. Covers 82 and 84 are also rotatable downward away from their respective screens 50 and 52 to a position generally perpendicular to image surfaces 56 and 58. In this position, covers 82 and 84 function as a stand for supporting display device 10 in its generally upright position to prevent the display from falling over.

Hinges 85 may be provided with a predetermined amount of rotational friction, an over-center spring mechanism, a detente or stop mechanism or the like to retain covers 82 and 84 in their respective open and closed positions to affirmatively aid in supporting display device 10 when in use and protecting screens 50 and 52 when the device is not in use. Covers 82 and 84 can also include latch mechanisms 86 adapted to interlock with corresponding lock mechanisms 88 located on top member 16 for locking protective covers 82 and 84 in their respective closed positions. Lock mechanisms 88 can also include a release mechanism for positively locking and releasing latches 86 relative to locks 88.

As illustrated in FIG. 1, to make the invention easily portable as intended, display device 10 may include a handle 90 disposed on top member 16 of bezel 12 for transporting the device. Handle 90 may be carried by any portion of bezel 12 and is merely shown on top member 16 for illustrative purposes. Such a handle may take on any number of constructions and configurations without departing from the scope of the present invention.

FIG. 4 illustrates another embodiment including front and rear lower protective covers 100 and 102 respectively, attached to bottom member 14 of bezel 12 by hinges 104 similar to protective covers 82 and 84 as described above. Lower protective covers 100 and 102 are constructed for supporting display device 10 when in their respective open positions as shown in FIG. 4 and for protectively covering the lower portions of image surfaces 56 and 58, respectively. In this embodiment, an additional upper front protective cover 106 and upper rear protective cover 108 are rotatably attached by hinges 109 to top member 16 of bezel 12. Front and rear upper covers 106 and 108, when in their respective closed positions must be of such a size as to cover the remaining portion of image surfaces 56 and 58 not covered by lower covers 100 and 102. When display device 10 is in use, upper covers 106 and 108 are simply rotated out of the way providing clear visual access to image surfaces 56 and 58 or are manipulated and positioned so as to act as sun or light visors preventing glare on either of the image surfaces when needed.

Hinges 104 and 109 can be constructed including positive positioning means similar to those as described above for hinges 85 for positively holding their respective protective covers in either the open position, closed position or both. Hinges 109 can also include an intermittent positioning mechanism for positively holding covers 106 and 108 in any number of positions between the fully opened and fully closed positions.

Operating power for display device 10 can be provided by a number of means without departing from the scope of the present invention. As illustrated in FIG. 1, display device 10 includes an optional external power connector 120 separate from input interface 80 for connecting the presentation display device to an external power source or for connection directly but separately to a mother system such as a computer for drawing power therefrom. The external power source may be a DC source or a converted AC source. The external source may also be a direct AC source, in which case display device 10 must include an internal AC to DC converter communicating with external power connector 120. In another alternative embodiment, protective covers 82 and 84, as illustrated in FIG. 3, can include a plurality of solar power cells 121 to provide all or part of the power necessary for operating presentation display device 10 of the invention.

Power to operate display device 10 may also be transmitted from the mother system to display device 10 through input interface 80. Power transmitted through a typical VGA interface or a high speed bus is not sufficient to run display device 10 in full light mode. In a further alternate embodiment, the input interface 80 may be a larger Universal Serial Bus (USB) connector that couples via cable with a USB port on the mother system for transmitting any or all of the power, audio, video and control signals from the mother system to display device 10.

In another alternative embodiment, display device 10 may include a rechargeable internal DC power source 124 such as a nickel-cadmium (Ni-Cad), lithium ion or other type of battery similar to those used for laptop or portable computers. Such a power source is generally shown in FIG. 1 and is commonly known to those skilled in the art. Display device 10 may in the alternative include means for receiving disposable or replaceable alkaline or Ni-Cad batteries or the like, although a large number of such batteries may be necessary to run the device at full power. As will be evident to those skilled in the art, the presentation display device may incorporate any number or type of power source without departing from the scope of the invention.

Figure 5:
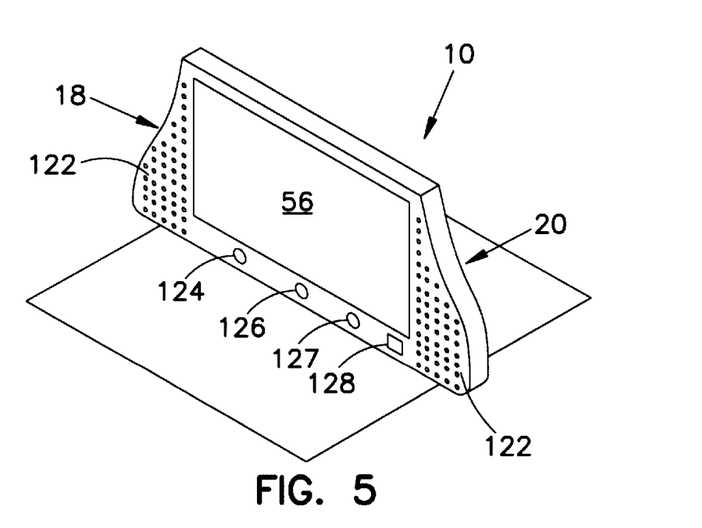
FIG. 5 is a front elevation view illustrating a presentation display device constructed in accordance with another embodiment of the present invention.

Presentation display device 10 of the invention can also include one or more built-in speakers 122, as illustrated in FIG. 5, which are carried directly within one or more of the bezel members 14, 16, 18 and 20. In one embodiment, a speaker 122 is built into the lower portion of each side member 18 and 20. Side members 18 and 20 can also house the necessary wiring routed between speakers 122 and input interface 80. In an alternate embodiment, one or more speakers may be built into bottom member 14 of bezel 12. Speakers added to the lower portions of side members 18 and 20 or to bottom member 14 add mass to the lower portion of display device 10 helping to support and maintain the device in an upright position. If desired, presentation display device 10 can be provided with internal full range, high fidelity speaker capabilities and additional ports for connecting display device 10 to any type of multi-media output device such as additional external speakers, headphones, and additional displays.

Bezel member 12 may also include a number of external controls which are illustrated in FIG. 5 disposed on bottom member 14. Typical external controls include a screen brightness control 124, screen contrast control 126, speaker volume control 127, and a screen on/off switch 128. A conventional status display device (not shown) for providing status information on available power level, type of power being used and the like may also be included on the display device of the invention. The external controls and status display may be carried on any portion or portions of the display device without departing from the scope of the present invention.

Figure 6:
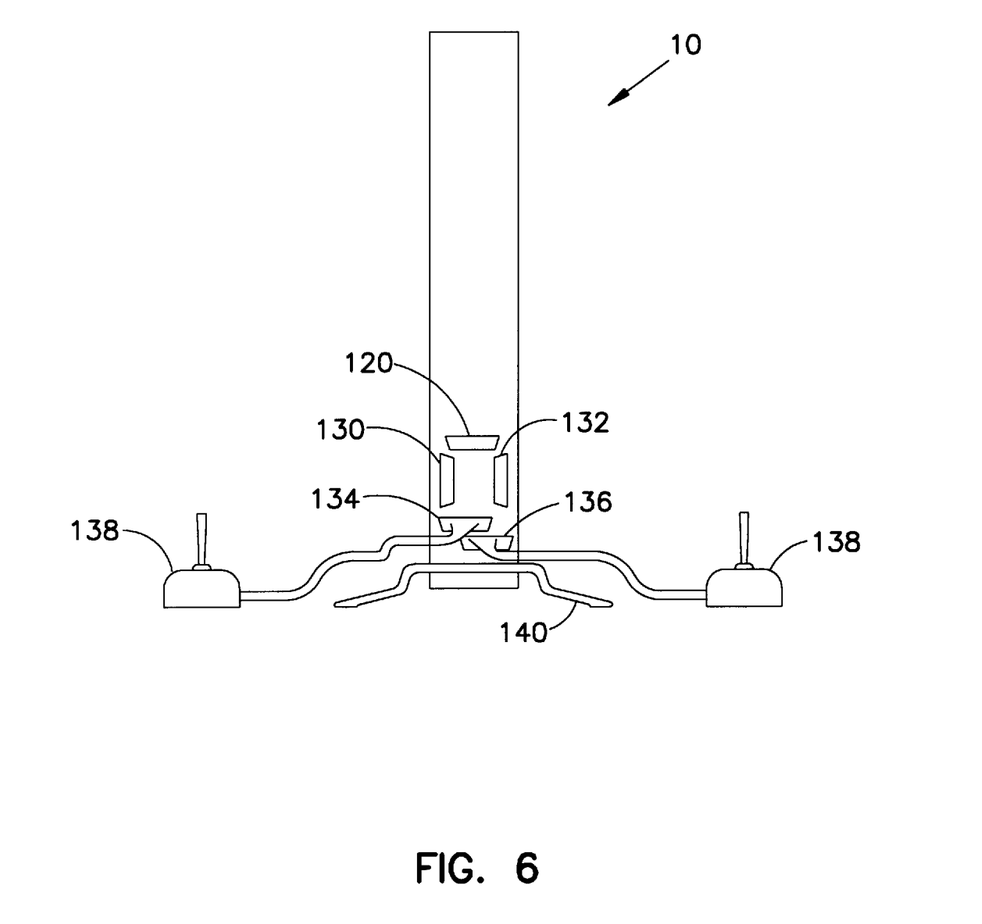
FIG. 6 is a perspective view illustrating an additional embodiment of a presentation display device constructed in accordance with the present invention.

In yet another embodiment of presentation display device 10 as illustrated in FIG. 6, the device includes dual input connectors 130 and 132 or may include a built-in signal splitter (not shown) for transmitting separate video signals to front and rear screens 50 and 52. In this embodiment, display device 10 also includes ports or connectors 134 and 136 for connection to an external input device such as a joy stick 138, a keyboard or other alternative input device for interactive or independent communication with each screen 50 and 52. The embodiment of FIG. 6 having a pair of joysticks 138 permits two users to sit opposite one another and play interactive electronic video games and view the same image simultaneously or a different image on each of front and rear image surface 56 and 58 of front and rear screens 50 and 52, respectively.

Display device 10 can also include a support stand 140 shown in FIGS. 1, 2 and 6 for positioning the device above a support surface and holding it in a fixed position. Support stand 140 can be separate from, molded integral with or hingedly connected to bezel 12. Support stand 140 can also be provided such that display device 10 is rotatable about an axis defined by bottom member 14 such that either front screen 50 or rear screen 52 is at an angle greater than 90° relative to a support surface while the other of the display panels is at an angle less than 90° relative to the support surface.

Figure 7:
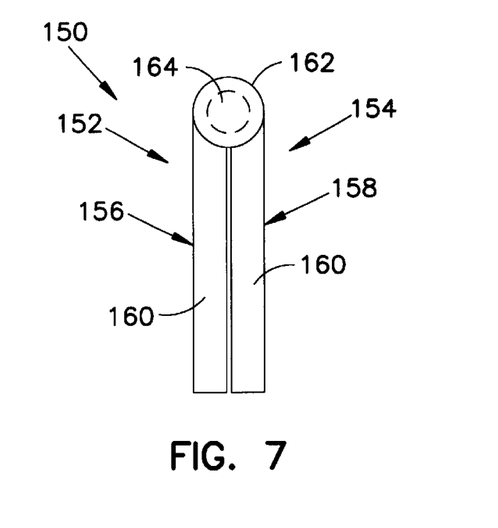
FIG. 7 is a side view illustrating another embodiment of a presentation display device constructed in accordance with the present invention.

In a still further embodiment, FIG. 7 illustrates a presentation display device 150 having a pair of display screens 152 and 154 disposed back to back of one another. Screens 152 and 154 each include an image surface 156 and 158, respectively, for displaying images thereon. Display device 150 includes a bezel 160 having a top member 162 which permits screens 152 and 154 to pivot relative to one another. Housed within top member 162 is a single light source 164 which is constructed and arranged to provide light to each of display screens 152 and 154. Display device 150 permits screens 152 and 154 to be oriented relative to one another in a range of positions such as back to back or 180° opposite one another as illustrated in FIG. 7. As illustrated in FIG.

Figure 7A:
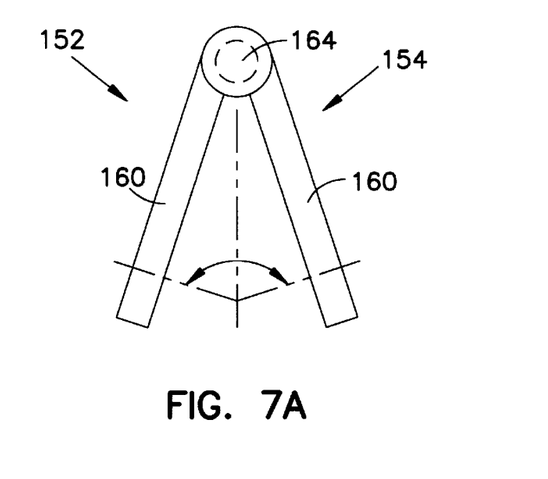
FIG. 7A is a side view of the presentation display device of FIG. 7 showing the display panels pivoted relative to one another.

7A, display screens 152 and 154 do not face directly opposite one another but have been rotated to an angle of less than 180° relative to one another. This feature permits a presenter to adjust the screen angle to accommodate various viewing audience arrangements. Display device 150 requires that each screen 152 and 154 have its own independent reflective plate with one reflective surface and an independent frame (not shown) similar in construction to reflective plate 60 and frame 48 of display device 10.

Figure 8:
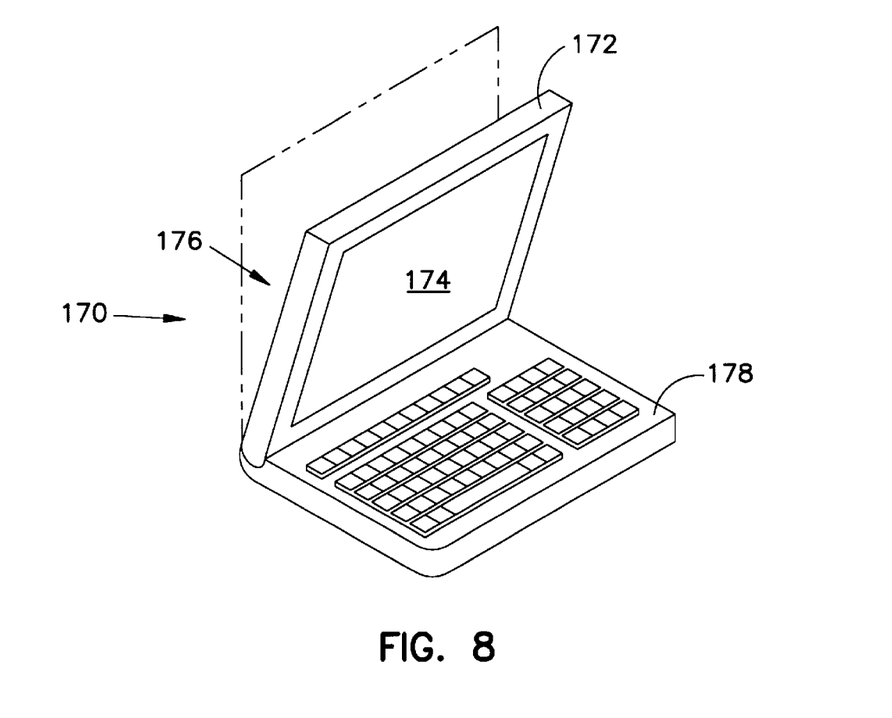
FIG. 8 is a perspective view of a laptop computer incorporating a presentation display device constructed in accordance with the present invention.

In yet another embodiment, FIG. 8 illustrates a laptop computer 170 having a bi-directional presentation display device 172 in place of a conventional single image surface screen. Display device 172 has a user image surface 174 and an audience image surface 176. The display is similar in construction to that of display device 10 of FIGS. 1 and 2 but is adapted to communicate with the laptop computer and substitute for the conventional screen. As shown in FIG. 8, display device 172 can be pivoted about the rear portion of a keyboard 178 similar to a conventional laptop computer screen. In one embodiment, laptop computer 170 includes software to control the operation of display device 172 to drive the LCDs in a user only mode or a dual display mode. In the user only mode, no image signal is sent to audience image surface 176 leaving the image surface blank whereas both image surfaces 174 and 176 receive an image signal in the dual display mode. Since a single light source is used to illuminate both image surfaces 174 and 176, both will be illuminated but only an image surface receiving a signal will display an image.

Each embodiment of the bidirectional presentation display device is intended for use in various presentation situations. The device may be set on a table and viewed by an audience from both sides while a presenter manipulates the images displayed from a remote computer having its own display screen. The device may be set between a presenter and an audience where one screen is visible to the audience and the other to the presenter. The device (especially laptop computer 170 incorporating device 172) is also useful for simply sharing computer information with others. The audience does not have to view a screen on an angle over the presenter's shoulder nor crowd the presenter while she enters information into the keyboard. The audience may now have its own screen to view directly.

Presentation quality is also enhanced by using the device of the invention. Images displayed on the screens of the device are produced thereon from direct electronic signals. The images are neither projected, enlarged nor displayed second hand on a surface such as a wall or roll-up film screen and thus will be clearer and sharper. Depending on the type and quality of the display screens used in the bi-directional presentation display device, the device may produce images of exceptional quality, fidelity and resolution.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A presentation display device comprising:

a front and a rear display screen, a front image surface defined by said front display screen and a rear image surface defined by said rear display screen, said front and rear display screens being positioned such that said front and rear image surfaces face in generally opposite directions relative to one another, a power supply to provide power to said display device, a reflective element disposed between said front and rear display screens, said reflective element having a front reflective surface on one side adjacent said front display screen and a rear reflective surface on the other side adjacent said rear display screen, and a light source for concurrently illuminating said front and rear display screens for displaying a front and rear image on said front and rear image surfaces, respectively.

2. The display of claim 1 wherein said front and rear display screens are liquid crystal display screens.

3. The display device of claim 1 wherein said light source is a single fluorescent light tube.

4. The display device of claim 1 further comprising a light distribution medium disposed between said front display screen and said front reflective surface and a light distribution medium disposed between said rear display screen and said rear reflective surface, wherein said light distribution mediums communicate with said light source.

5. The display device of claim 4 wherein each of said light distribution mediums comprises a plurality of light pipes.

6. The display device of claim 1 wherein said front and rear display screens are supported substantially perpendicular to a support surface on which said display device rests.

7. The display device of claim 6 wherein said front and rear display screens are supported substantially back to back relative to one another such that said front and rear image surfaces display said front and rear images back to back relative to one another.

8. The display device of claim 7 wherein said front and rear display screens are adjustable on an axis parallel to said support surface such that said front and rear display screens may be selectively oriented between a position perpendicular to said support surface and a position generally parallel to said support surface.

9. The display device of claim 1 further comprising a first and a second protective cover, said first cover removably covering said first image surface when in a closed position and said second cover removably covering said second image surface when in a closed position.

10. The display device of claim 9 wherein said first and second covers are pivotally rotatable relative to said front and rear display screens from said closed position to an open position, said first cover exposing said first image surface when in said open position and said second cover exposing said second image surface when in said open position.

11. The display device of claim 1 wherein said power supply comprises a power connector adapted to connect said display device to an external power source.

12. The display device of claim 1 further comprising an input interface for receiving an image signal from an image source.

13. The display device of claim 12 wherein said power supply comprises a power connector adapted to connect said display device to an external power source.

14. The display device of claim 12 wherein said image source is a computer.

15. The display device of claim 1 wherein said power supply comprises a power connector adapted to receive therein a DC power supply.

16. The display device of claim 15 wherein said power connector is adapted to receive therein an on-board DC power supply.

17. The display device of claim 15 wherein said power connector is adapted to connect to an external DC power supply.

18. The display device of claim 1 wherein said power supply comprises a first solar panel.

19. The display device of claim 18 wherein said power supply further comprises a second solar panel, said first solar panel removably covering said first image surface when in a closed position and said second panel covering said second image surface when in a closed position.

20. The display device of claim 19 wherein said first and second solar panels are pivotally rotatable relative to said front and rear display screens from said closed position to an open position, said first solar panel exposing said first image surface when in said open position and said second solar panel exposing said second image surface when in said open position.

21. A laptop computer comprising:

a keyboard, a frame pivotally carried by said keyboard, a front and a rear display screen each supported by said frame, a front image surface generally facing said keyboard defined by said front display screen and a rear image surface defined by said rear display screen, said rear display screen being positioned such that said rear image surfaces face generally opposite said front image surface, a reflective element carried by said frame for said front and rear display screens disposed between said display screens said reflective element having a front reflective surface on one side adjacent said front display screen and a rear reflective surface on the other side adjacent said rear display screen, and a light source carried by said frame for concurrently illuminating said front and rear display screens for displaying a front and rear image on said front and rear image surfaces, respectively.

22. The laptop computer of claim 21 wherein said front and rear display screens are liquid crystal display screens.

23. The laptop computer of claim 21 wherein said display screens are operable such that said rear image surface can be activated or deactivated to selectively display an image thereon while said front image surface displays an image thereon.

24. The laptop computer of claim 21 wherein said light source is a single fluorescent light tube.

25. A liquid crystal display device comprising:

a frame, a front and a rear liquid crystal display screen each supported by said frame, a front image surface defined by said front display screen and a rear image surface defined by said rear display screen, said display screens being positioned such that said image surfaces face in generally opposite directions relative to one another, an input interface adapted to connect said display device to an image source and for receiving image signals therefrom, a power supply adapted to provide power to said front and rear display screens, a reflective element carried by said frame for said front and rear display screens disposed between said display screens, said reflective element having a front reflective surface on one side adjacent said front display screen and a rear reflective surface on the other side adjacent said rear display screen, and a light source carried by said frame for concurrently illuminating said front and rear display screens for displaying a front and rear image on said front and rear image surfaces, respectively.

26. The liquid crystal display device of claim 25 wherein said light source is a single fluorescent light tube.

* * * * *